United States Patent [19]
Bimberg et al.

[11] Patent Number: 5,623,788
[45] Date of Patent: Apr. 29, 1997

[54] ROOF ANCHORING APPARATUS

[76] Inventors: Uwe H. Bimberg; Oliver U. Bimberg, both of 11629 Casa View Dr., El Paso, Tex. 79936

[21] Appl. No.: 612,235

[22] Filed: Mar. 7, 1996

[51] Int. Cl.$^6$ ............................................. E04B 7/00
[52] U.S. Cl. ........................ 52/23; 52/3; 52/DIG. 11; 52/4
[58] Field of Search ................... 52/23, DIG. 11, 52/3, 4

[56] References Cited

U.S. PATENT DOCUMENTS

| | | | |
|---|---|---|---|
| 777,441 | 12/1904 | Small | 52/23 |
| 3,691,703 | 9/1972 | Barnes | 52/23 |
| 3,726,054 | 4/1973 | Anderson et al. | 52/23 |
| 3,757,475 | 9/1973 | Hackworth | 52/23 |
| 3,869,836 | 3/1975 | Allen. | |
| 3,894,365 | 7/1975 | Abbott. | |
| 3,943,670 | 3/1976 | Miller. | |
| 4,003,169 | 1/1977 | Young, II | 52/23 X |
| 4,180,952 | 1/1980 | Vanderlyn. | |
| 5,257,483 | 11/1993 | Netek. | |
| 5,319,896 | 6/1994 | Winger. | |
| 5,522,184 | 6/1996 | Oveido-Reyes | 52/23 |

*Primary Examiner*—Wynn E. Wood
*Assistant Examiner*—Timothy B. Kang

[57] ABSTRACT

A roof anchoring apparatus includes roof-pressing assemblies for placement on a roof of a building structure. The roof-pressing assemblies are arrayed on the roof from one edge of the roof to another edge of the roof. Each roof-pressing assembly includes a roof-pressing portion which has a top side and a bottom side. One or more cable locking assemblies project upward from the top side of the roof-pressing portion. First cables are connected between neighboring roof-pressing assemblies. Second cable assemblies are provided, and each second cable assembly has a first end and a second end. The first end of each second cable assembly is connected to one of the roof-pressing assemblies located at an edge of the roof. Ground-engaging assemblies are provided, and each ground-engaging assembly is connected to a second end of a second cable assembly. The roof-pressing portions may be in the form of plates or L-shaped brackets. Crosspiece members may be placed between the L-shaped brackets and the roof. Each of the second cable assemblies includes a turnbuckle assembly for adjusting cable tension. Each of the ground-engaging assemblies includes a handle portion and a spade portion. Roof-apex-covering assemblies are provided, and each roof-apex-covering assembly is connected between a pair of the roof-pressing assemblies. Each roof-apex-covering assembly includes a pair of roof-pressing members and a hinge assembly connected between the pair of roof-pressing members.

11 Claims, 4 Drawing Sheets

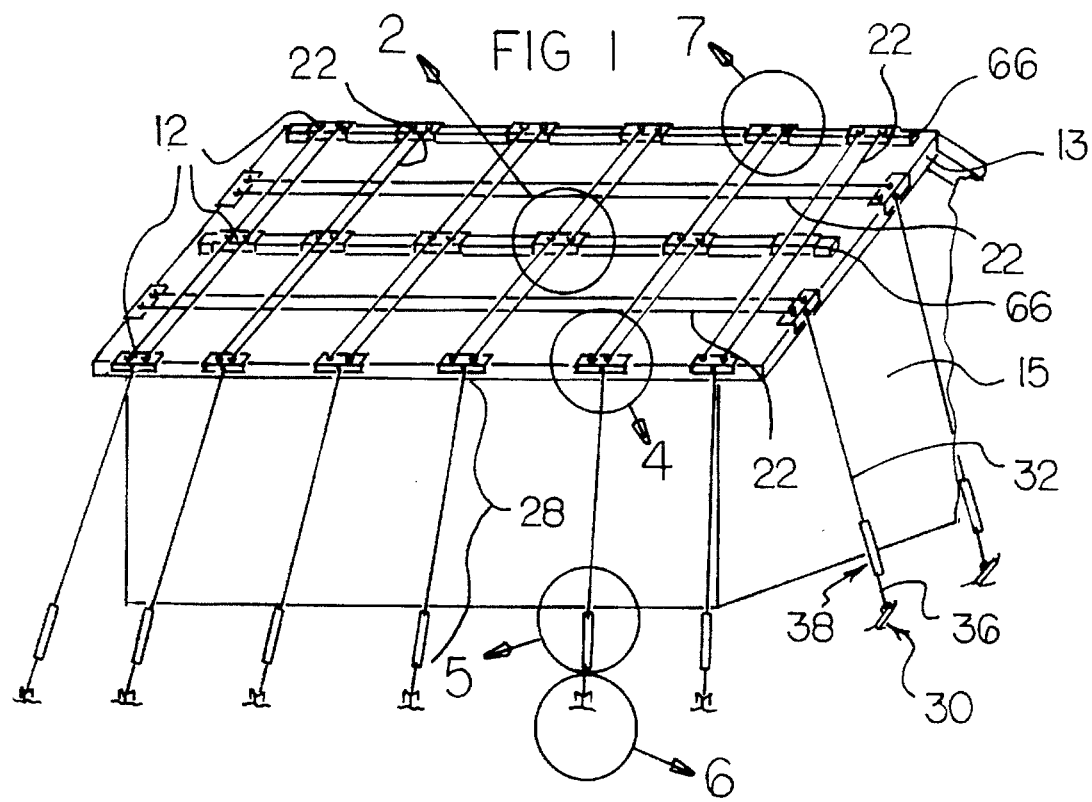
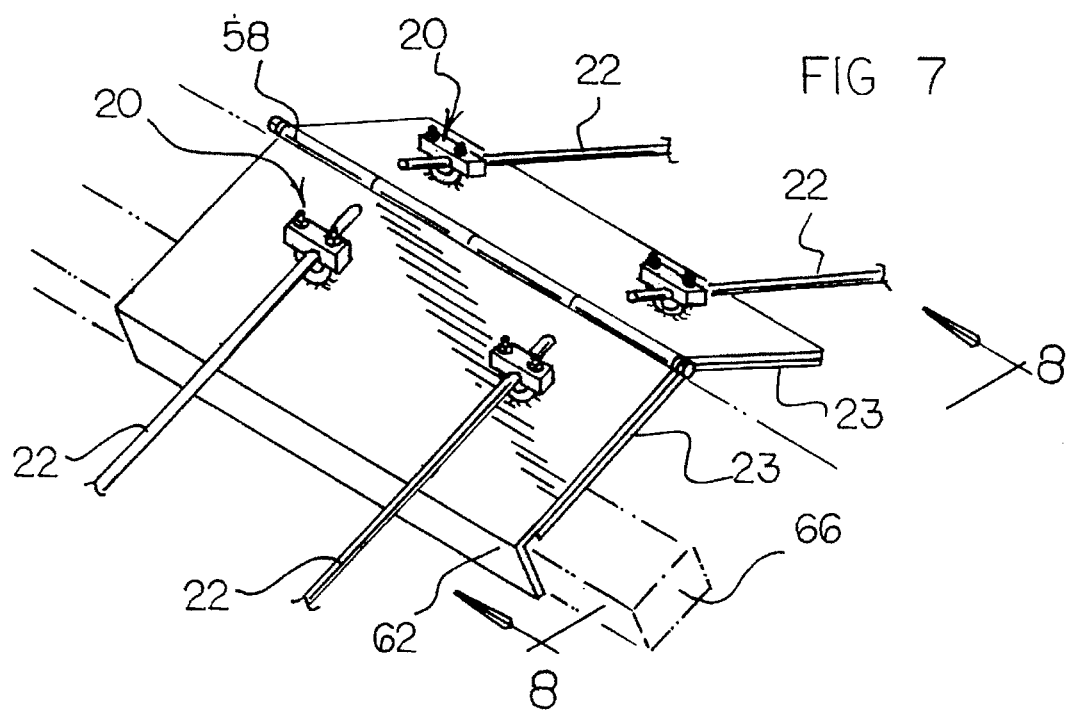

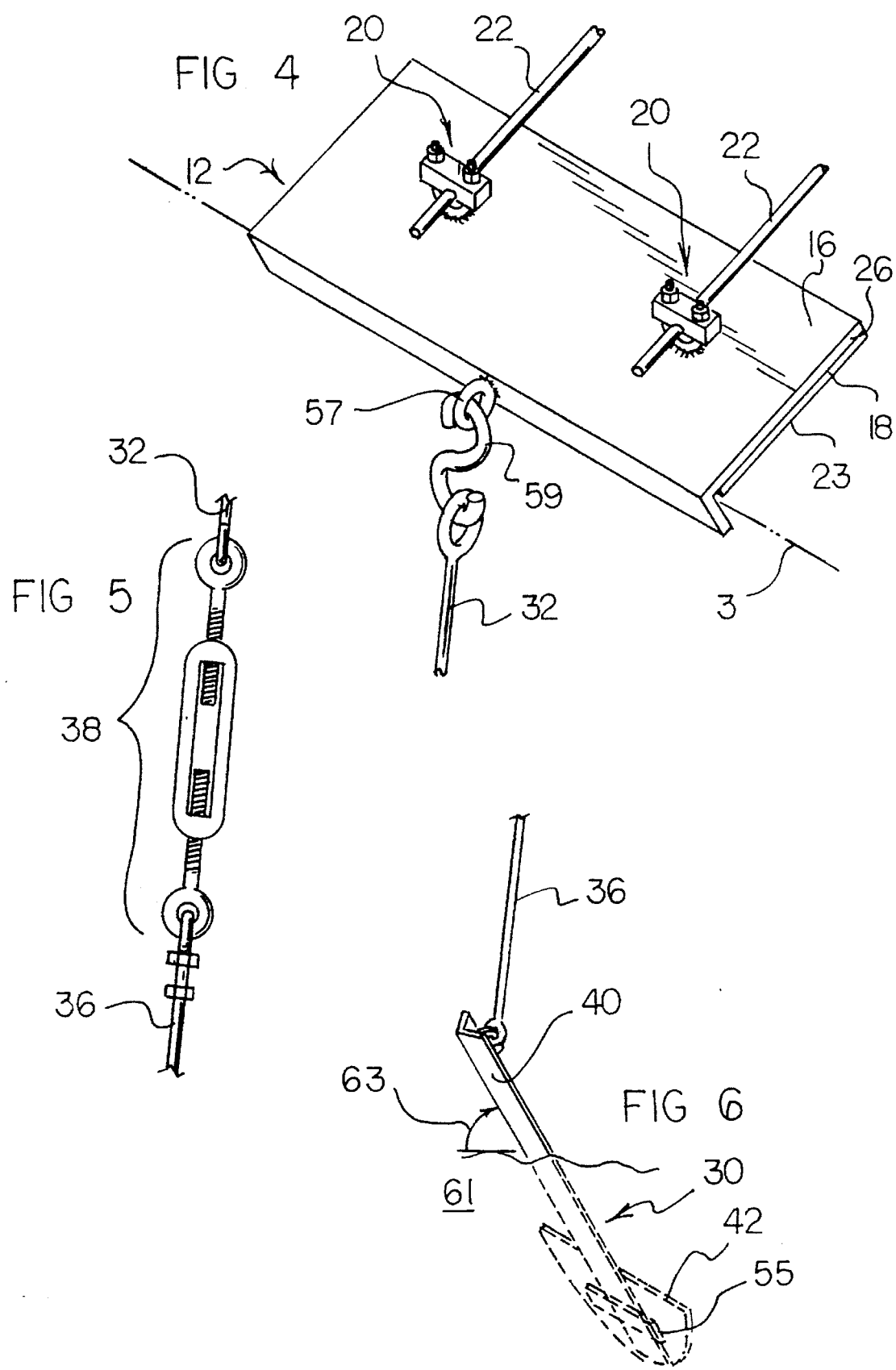

ROOF ANCHORING APPARATUS

BACKGROUND OF THE INVENTION

1. Field of the Invention

The present invention relates generally to devices for reinforcing building structures and, more particularly, to devices especially adapted for securing roofs to other building structures.

2. Description of the Prior Art

In high winds, such as present in hurricanes, tornados, typhoons, and the like, danger to the structural integrity of buildings is well known. In this respect, throughout the years, a number of innovations have been developed relating to improving the structural integrity of buildings in high winds, and the following U.S. patents are representative of some of those innovations: U.S. Pat. Nos. 3,869,836, 3,943,670, 4,180,952, 5,257,483, and 5,319,896. More specifically, U.S. Pat. No. 3,869,836 discloses a mobile home protector that employs rigid anchors that are permanently in place in the ground around the periphery of the mobile home and that are taller than the mobile home itself. Such tall, permanently-placed, rigid, and ground-mounted anchors may detract from the appearance of the mobile home when there is no danger of a storm. Moreover, such rigid structures may be difficult to transport and install. In view of the above, it would be desirable if an anchoring device for a building structure did not employ tall, permanently-placed, rigid, ground-mounted anchors.

U.S. Pat. No. 3,943,670 discloses an anchoring system for mobile homes that employs fittings for the mobile home that are mounted on edges of the roof of the mobile home. The main portions of the roof, located between the roof edges, are not contacted by the system in this patent. To resist structural damage in high winds, it would be desirable if a roof anchoring device would directly contact portions of the roof located between the edges of the roof.

U.S. Pat. No. 4,180,952 discloses an anchoring system for a structure that does include any elements for securing a roof to a structure. In this patent, there is disclosure of securing the bottom portion of a building structure to the ground. As made clear hereinabove, it would be desirable if an anchoring system for a building structure includes elements for securing the roof to the walls of the building structure.

U.S. Pat. No. 5,257,483 discloses the use of reinforcing ties placed between a roof and walls of a building structure to secure to roof to the walls. In very high winds, it would be desirable to secure the anchor building to the earth rather than merely securing the roof to the walls of the structure. In view of the above, it would be desirable if an anchoring device for a building structure were provided which secures substantially the entire structure to the earth.

U.S. Pat. No. 5,319,896 discloses an anchoring system for securing buildings during high winds. With this device, frame structures under a roof are used with attached cables to secure the building to the earth. This device does not employ elements that fit on the top of the roof to secure the top of the roof to the remainder of the building structure. In view of the above, it would be desirable if an anchoring device for a building structure secured the top of the roof to the remainder of the building structure.

Still other features would be desirable in a roof anchoring devices. Different roofs have different degrees of slope. In view of the above, it would be desirable if an anchoring device for a building structure had components adapted to fit onto a wide variety of sloped roofs. Moreover, dangerous winds can come against a building in any direction. In view of the above, it would be desirable if an anchoring device for a building structure secures the structure to the earth in all directions around the structure.

A variety of roofs may require a variety of securing tensions for securing different roofs to the earth. In view of the above, it would be desirable if an anchoring device for a building structure includes adjustable tensioning devices.

Often when devices are secured to the earth, stakes are driven into the earth for securing the devices to the earth. Stakes are generally relatively long and slender devices. As a result, a long and slender portion of the earth lies on top of a stake that has been driven into the earth. A long and slender portion of the earth may provide a relatively light weight for pressing down on the stake. In view of the above, it would be desirable if an anchoring device for a building structure used anchoring elements, which are driven into the earth, that include relatively wide, ground-received portions. With relatively wide, ground-received portions, a relatively heavy weight of earth would be above the relatively wide, ground-received portions for more effectively securing those anchoring portions in the earth.

Thus, while the foregoing body of prior art indicates it to be well known to use devices for securing a building structure to the ground, the prior art described above does not teach or suggest a roof anchoring apparatus which has the following combination of desirable features: (1) does not employ tall, permanently-placed, rigid, ground-mounted anchors; (2) directly contacts portions of the roof located between the edges of the roof; (3) does not include elements for securing the roof to the walls of the building structure; (4) secures substantially the entire building structure to the earth; (5) secures the top of the roof to the remainder of the building structure; (6) has components adapted to fit onto a wide variety of sloped roofs; (7) secures the building structure to the earth in all directions around the structure; (8) includes adjustable tensioning devices; and (9) includes relatively wide, ground-received portions. The foregoing desired characteristics are provided by the unique roof anchoring apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a roof anchoring apparatus which includes a plurality of roof-pressing assemblies for placement on a roof of a building structure. The roof-pressing assemblies are arrayed on the roof from one edge of the roof to another edge of the roof. Each roof-pressing assembly includes a roof-pressing portion which has a top side and a bottom side. One or more cable locking assemblies project upward from the top side of the roof-pressing portion. A plurality of first cables are connected between neighboring roof-pressing assemblies. A plurality of second cable assemblies are provided, and each second cable assembly has a first end and a second end. The first end of each second cable assembly is connected to one of the roof-pressing assemblies located at an edge of the roof. A plurality of ground-engaging assemblies are provided, and each ground-engaging assembly is connected to a second end of a second cable assembly. A resilient pad, such as made from a rubber material, is connected to the bottom side of the roof-pressing portion of the roof-pressing assemblies.

Each of the cable locking assemblies includes a U-shaped member which has a round portion and straight portions projecting from the round portion. A lock bar is connected to the straight portions of the U-shaped member, and pressure retainers are connected to the straight portions of the U-shaped member for locking the lock bar onto the U-shaped member. The roof-pressing portions are in a form of plates. The roof-pressing portions are in a form of L-shaped brackets. A plurality of crosspiece members may be placed between the L-shaped brackets and the roof.

Each of the second cable assemblies includes a first pulling cable connected to one of the roof-pressing assemblies located at an edge of the roof. A tension adjusting assembly is connected to the first pulling cable, and a second pulling cable is connected between the tension adjusting assembly and one of the ground-engaging assembly. The tension adjusting assembly includes a turnbuckle assembly.

Each of the ground-engaging assemblies includes a handle portion connected to one of the second cable assemblies. A spade portion is connected to the handle portion. One or more crossbar members is connected to the spade portions of the ground-engaging assemblies.

A plurality of roof-apex-covering assemblies are provided, and each roof-apex-covering assembly is connected between a pair of the roof-pressing assemblies. Each roof-apex-covering assembly includes a pair of roof-pressing members, and a hinge assembly is connected between the pair of roof-pressing members. The pair of roof-pressing members may be in the form of plates or in the form of L-shaped brackets. A plurality of crosspiece members may be placed between the pair of roof-pressing members and the roof.

The above brief description sets forth rather broadly the more important features of the present invention in order that the detailed description thereof that follows may be better understood, and in order that the present contributions to the art may be better appreciated. There are, of course, additional features of the invention that will be descried hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved roof anchoring apparatus which has all of the advantages of the prior art and none of the disadvantages.

It is another object of the present invention to provide a new and improved roof anchoring apparatus which may be easily and efficiently manufactured and marketed.

It is a further object of the present invention to provide a new and improved roof anchoring apparatus which is of durable and reliable construction.

An even further object of the present invention is to provide a new and improved roof anchoring apparatus which is susceptible of a low cost of manufacture with regard to both materials and labor, and which accordingly is then susceptible of low prices of sale to the consuming public, thereby making such roof anchoring apparatus available to the buying public.

Still yet a further object of the present invention is to provide a new and improved roof anchoring apparatus which does not employ tall, permanently-placed, rigid, ground-mounted anchors.

Still another object of the present invention is to provide a new and improved roof anchoring apparatus that directly contacts portions of the roof located between the edges of the roof.

Yet another object of the present invention is to provide a new and improved roof anchoring apparatus which does not include elements for securing the roof to the walls of the building structure.

Even another object of the present invention is to provide a new and improved roof anchoring apparatus that secures substantially the entire building structure to the earth.

Still a further object of the present invention is to provide a new and improved roof anchoring apparatus which secures the top of the roof to the remainder of the building structure.

Yet another object of the present invention is to provide a new and improved roof anchoring apparatus that has components adapted to fit onto a wide variety of sloped roofs.

Still another object of the present invention is to provide a new and improved roof anchoring apparatus which secures the building structure to the earth in all directions around the structure.

Yet another object of the present invention is to provide a new and improved roof anchoring apparatus that includes adjustable tensioning devices.

Still a further object of the present invention is to provide a new and improved roof anchoring apparatus that includes relatively wide, ground-received portions.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the roof anchoring apparatus of the invention installed on a building structure having a sloped roof.

FIG. 4 is an enlarged perspective view of a portion of the embodiment of the invention shown in FIG. 1, contained in circled region 4, wherein a component of the invention is employed at an edge of the roof.

FIG. 5 is an enlarged perspective view of a portion of the embodiment of the invention shown in FIG. 1, contained in circled region 5, wherein a component of the invention is employed for adjusting tension in anchoring cables.

FIG. 6 is an enlarged perspective view of a portion of the embodiment of the invention shown in FIG. 1, contained in circled region 6, wherein a component of the invention is driven into the earth.

FIG. 7 is an enlarged perspective view of a portion of the embodiment of the invention shown in FIG. 1, contained in circled region 7 therein, wherein a component of the invention conforms to the slope of the sloped roof of the building structure and fits over the apex of the roof.

DESCRIPTION OF THE PREFERRED EMBODIMENT

Figure 3:
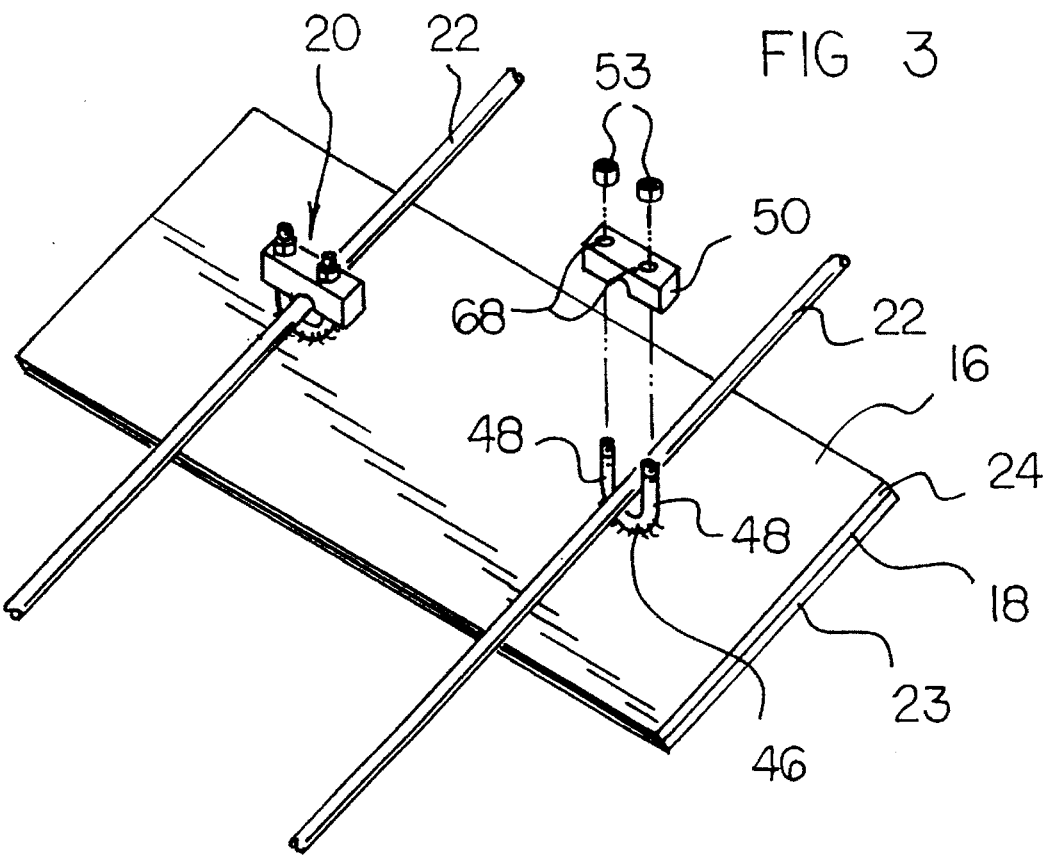
FIG. 3 is a side view of a variation of the embodiment of the invention shown in FIG. 2 using a different component employed between the apex of the roof and an edge of the roof.

With reference to the drawings, a new and improved roof anchoring apparatus embodying the principles and concepts of the present invention will be described.

Turning to FIGS. 1–9, there is shown an exemplary embodiment of the roof anchoring apparatus. In its preferred form, roof anchoring apparatus includes a plurality of roof-pressing assemblies 12 for placement on a roof 13 of a building structure 15. The roof-pressing assemblies 12 are arrayed on the roof 13 from one edge of the roof 13 to another edge of the roof 13. Each roof-pressing assembly 12 includes a roof-pressing portion which has a top side 16 and a bottom side 18. One or more cable locking assemblies 20 project upward from the top side 16 of the roof-pressing portion. A plurality of first cables 22 are connected between neighboring roof-pressing assemblies 12. A plurality of second cable assemblies 28 are provided, and each second cable assembly 28 has a first end and a second end. The first end of each second cable assembly 28 is connected to one of the roof-pressing assemblies 12 located at an edge of the roof 13. A plurality of ground-engaging assemblies 30 are provided, and each ground-engaging assembly 30 is connected to a second end of a second cable assembly 28. A resilient pad 23, such as made from a rubber material, is connected to the bottom side 18 of the roof-pressing portion of the roof-pressing assemblies 12.

Figure 2:
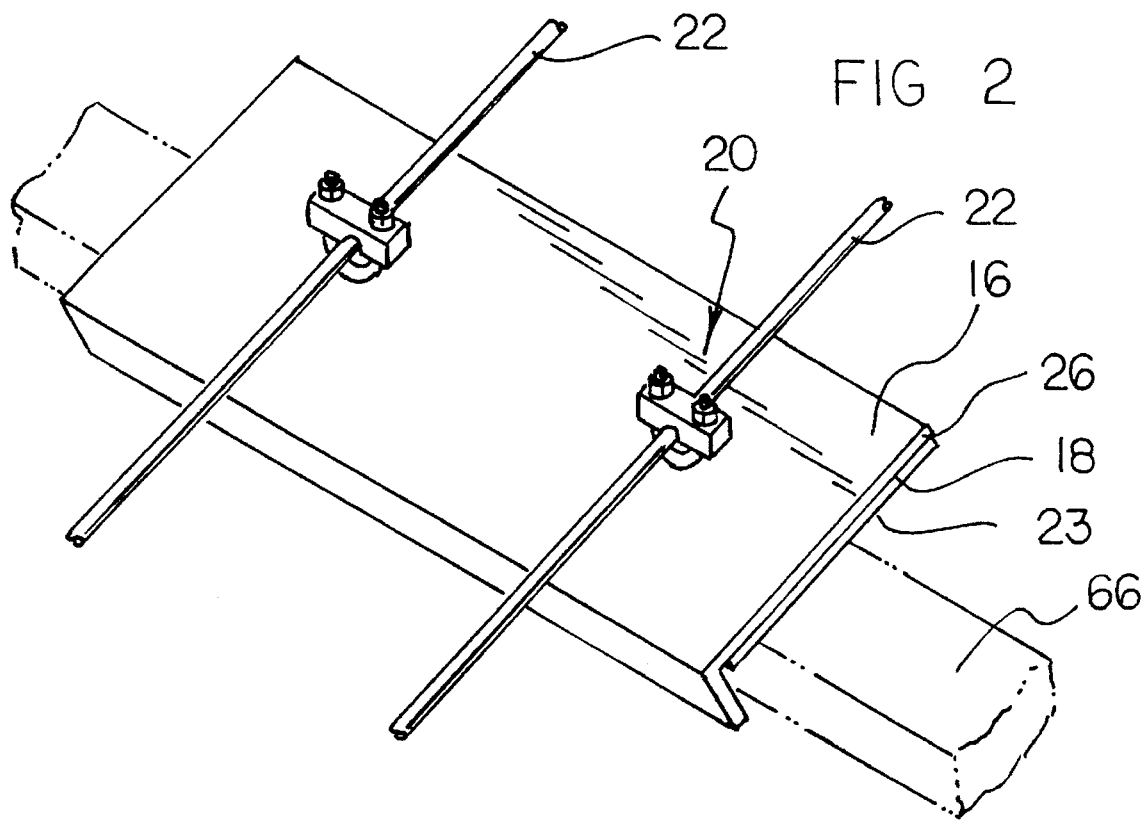
FIG. 2 is an enlarged perspective view of a portion of the embodiment of the invention shown in FIG. 1, contained in circled region 2, wherein a component of the invention is employed between the apex of the roof and an edge of the roof.

Each of the cable locking assemblies 20 includes a U-shaped member which has a round portion 46 and straight portions 48 projecting from the round portion 46. A lock bar 50 is connected to the straight portions 48 of the U-shaped member, and pressure retainers are connected to the straight portions 48 of the U-shaped member for locking the lock bar 50 onto the U-shaped member. The lock bar 50 has channels 68 which receive the straight portions 48 of the U-shaped member. The ends of the straight portions 48 are threaded. The pressure retainers are threaded nuts 53 that are screwed onto the threaded ends of the straight portions 48. As shown in FIG. 3, The roof-pressing portions are in a form of plates 24. As shown in FIG. 2, The roof-pressing portions are in a form of L-shaped brackets 26. A plurality of crosspiece members 66 may be placed between the L-shaped brackets 26 and the roof 13. The crosspiece members 66 can be made from pieces of lumber.

Each of the second cable assemblies 28 includes a first pulling cable 32 connected to one of the roof-pressing assemblies 12 located at an edge of the roof 13. A tension adjusting assembly is connected to the first pulling cable 32, and a second pulling cable 36 is connected between the tension adjusting assembly and one of the ground-engaging assembly 30. The tension adjusting assembly includes a turnbuckle assembly 38.

Each of the ground-engaging assemblies 30 includes a handle portion 40 connected to one of the second cable assemblies 28. A spade portion 42 is connected to the handle portion 40. One or more crossbar members 55 is connected to the spade portions 42 of the ground-engaging assemblies 30. The number and thicknesses of the crossbar members 55 on the spade portion 42 can be adjusted, depending upon the characteristics of the soil into which the spade portion 42 is driven.

Figure 9:
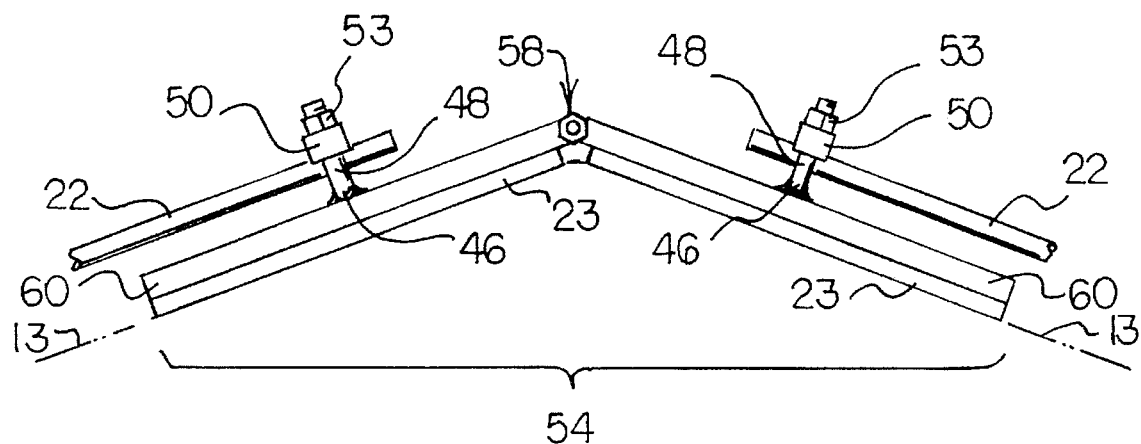
FIG. 9 is a side view of a variation of the embodiment of the invention shown in FIG. 8 using different slope-conforming and apex-covering components.
Figure 8:
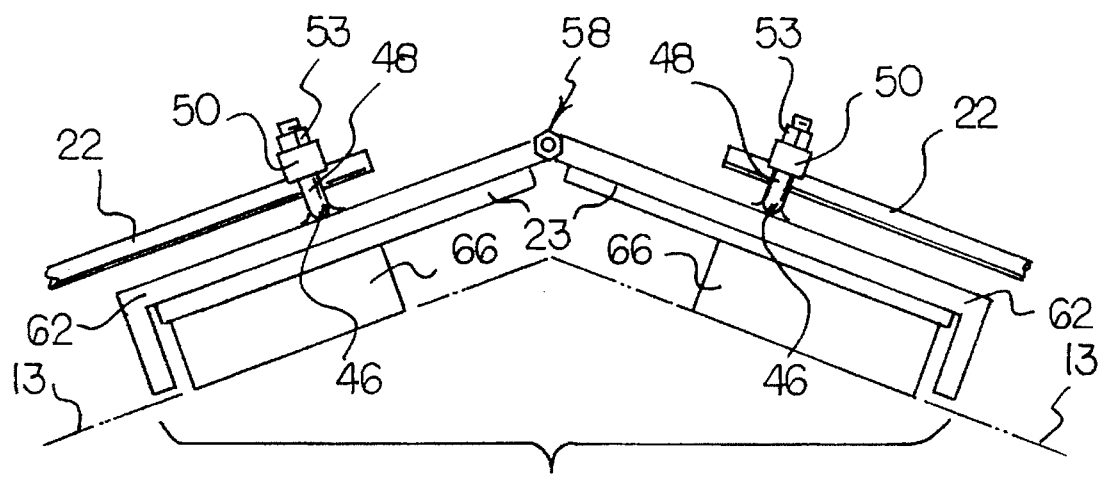
FIG. 8 is a side view of the portion of the embodiment of the invention shown in FIG. 7 taken along line 8—8 thereof.

A plurality of roof-apex-covering assemblies 54 are provided, and each roof-apex-covering assembly 54 is connected between a pair of the roof-pressing assemblies 12. Each roof-apex-covering assembly 54 includes a pair of roof-pressing members, and a hinge assembly 58 is connected between the pair of roof-pressing members. As shown in FIG. 9, the pair of roof-pressing members are in a form of plates 60. As shown in FIG. 8, the pair of roof-pressing members are in a form of L-shaped brackets 62. A plurality of crosspiece members 66 may be placed between the pair of roof-pressing members and the roof 13.

In using the surface washer apparatus of the invention, roof-apex-covering assemblies 54 are placed over the apex of a roof 13 of a building structure 15. Crosspiece members 66 are placed at a sequence of locations on the roof 13. Roof-apex-covering assemblies 54 having L-shaped brackets 62 are placed over the crosspiece members 66 near the roof apex. Roof-pressing assemblies 12 having L-shaped brackets 26 are placed over crosspiece members 66 between the apex of the roof 13 and an edge of the roof 13. Roof-pressing assemblies 12 having L-shaped brackets 26 are placed at edges of the roof 13. Roof-pressing assemblies 12 are located on each of the edges of the roof 13.

A set of first cables 22 extends between each roof-apex-covering assembly 54 and the array of associated roof-pressing assemblies 12 on one side of the roof 13. Another set of first cables 22 extends between each roof-apex-covering assembly 54 and the array of associated roof-pressing assemblies 12 on the other side of the roof 13. Also, on each side of the roof 13, a set of first cables 22 extends across each respective side of the roof 13 from edge to edge. The first cables 22 are locked on the roof-pressing assemblies 12 using the cable locking assemblies 20. More specifically, the first cables 22 pass between the straight portions 48 of U-shaped members. Lock bars 50 are pressed up against the first cables 22, and threaded nuts 53 are used to press the lock bars 50 against the first cables 22 for securing the first cables 22 onto the cable locking assemblies 20. As shown in FIG. 4, each roof-pressing assembly 12 that is located at the edge of the roof 13 includes a ring 57. An S-shaped link 59 is provided between the ring 57 and the first pulling cable 32 of each second cable assembly 28.

The ground-engaging assembly 30 is driven into the ground 61. This is done by tilting the handle portion 40 and the spade portion 42 so that the handle portion 40 and the spade portion 42 make an acute angle 63 with respect to the surface of the ground 61. The end of the handle portion 40 is hammered so that the spade portion 42 is driven into the ground 61 at the acute angle 63. In this way, a relatively large and relatively heavy amount of soil is located above the spade portion 42 of the ground-engaging assembly 30 when the spade portion 42 is driven into the ground 61.

Once the roof-apex-covering assemblies 54, the roof-pressing assemblies 12, the crosspiece members 66, the first cables 22, the second cable assemblies 28, and the ground-engaging assemblies 30 are in proper position, the turnbuckle assemblies 38 of the second cable assemblies 28 can be adjusted to tighten the tension on the first cables 22 and the second cable assemblies 28. By tightening these cable tensions, the roof-apex-covering assemblies 54, the roof-pressing assemblies 12, and the crosspiece members 66 exert downward pressure on the roof 13. In this way, the roof 13 is ultimately anchored through the cables by the ground 61. Preferably, the tensions exerted the cables are evenly distributed around the periphery of the roof 13.

To remove the surface washer apparatus of the invention from the roof 13 of the building structure 15, the turnbuckle assemblies 38 are turned so that tension is reduced on the first cables 22 and the second cable assemblies 28. Then, the S-shaped links 59 can be removed from the rings 57 on roof-pressing assemblies 12. Then, the roof-apex-covering assemblies 54 and the roof-pressing assemblies 12 can be removed from the roof 13. In addition, the ground-engaging assemblies 30 can be pulled out of the ground 61.

The components of the roof anchoring apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved roof anchoring apparatus that is low in cost, relatively simple in design and operation, and which may advantageously be used without employing tall, permanently-placed, rigid, ground-mounted anchors. With the invention, a roof anchoring apparatus is provided which directly contacts portions of the roof located between the edges of the roof. With the invention, a roof anchoring apparatus is provided which does not include elements for securing the roof to the walls of the building structure. With the invention, a roof anchoring apparatus is provided which secures substantially the entire building structure to the earth. With the invention, a roof anchoring apparatus is provided which secures the top of the roof to the remainder of the building structure. With the invention, a roof anchoring apparatus is provided which has components adapted to fit onto a wide variety of sloped roofs. With the invention, a roof anchoring apparatus is provided which secures the building structure to the earth in all directions around the structure. With the invention, a roof anchoring apparatus is provided which includes adjustable tensioning devices. With the invention, a roof anchoring apparatus is provided which includes relatively wide, ground-received portions.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A roof anchoring apparatus, comprising:
   a first plurality of roof-pressing assemblies for placement on a roof of a building structure, said first plurality of roof-pressing assemblies being positionable in an array on the roof from a first edge of the roof to a second edge of the roof,
   a second plurality of roof-pressing assemblies for placement on the roof, said second plurality of roof-pressing assemblies being positionable in an array on the roof from the first edge of the roof to the second edge of the roof, wherein each of the roof-pressing assemblies includes a roof-pressing portion having a top side and a bottom side, and at least one cable locking assembly projecting upward from said top side of said roof-pressing portion,
   a first plurality of first cables connected between the first plurality of roof-pressing assemblies,
   a second plurality of first cables connected between the second plurality of roof-pressing assemblies,
   a first rigid crosspiece member positioned in abutting contact with the bottom side of the roof-pressing portion of one of the first plurality of roof-pressing assemblies, the first rigid crosspiece member extending from the one of the first plurality of roof-pressing assemblies and into abutting contact with the bottom side of the roof-pressing portion of one of the second plurality of roof-pressing assemblies;
   a plurality of second cable assemblies, each second cable assembly having a first end and a second end, with said first end of each second cable assembly being connected to an individual one of said roof-pressing assemblies located at one of the edges of the roof,
   a plurality of ground-engaging assemblies, wherein each ground-engaging assembly is connected to an individual one of the second end of said second cable assemblies.

2. The apparatus of claim 1 wherein said roof-pressing portions comprise L-shaped brackets.

3. The apparatus of claim 1 further including:
   a first roof-apex-covering assembly positioned between two of the first plurality of roof-pressing assemblies;
   a second roof-apex-covering assembly positioned between two of the second plurality of roof-pressing assemblies, wherein each of the roof-apex-covering assemblies comprises a pair of roof-pressing members having a top side and a bottom side, and a hinge assembly connected between said pair of roof-pressing members;

a second rigid crosspiece member positioned in abutting contact with the bottom side of the roof-pressing member of the first roof-apex-covering assembly, the second rigid crosspiece member extending from the first roof-apex-covering assembly and into abutting contact with the bottom side of the roof-pressing member of the second roof-apex-covering assembly.

4. The apparatus of claim 3 wherein the pair of roof-pressing members of each of the roof-apex-covering assemblies comprise L-shaped brackets.

5. The apparatus of claim 1 further including:

a resilient pad connected to said bottom side of said roof-pressing portion of said roof-pressing assemblies.

6. The apparatus of claim 1 wherein each of said cable locking assemblies includes:

a U-shaped member having a round portion and straight portions projecting from said round portion, a lock bar connected to said straight portions of said U-shaped member, and pressure retainers, connected to said straight portions of said U-shaped member, for locking said lock bar onto said U-shaped member.

7. The apparatus of claim 1 wherein said roof-pressing portions are in a form of plates.

8. The apparatus of claim 1 wherein each of said second cable assemblies includes:

a first pulling cable connected to one of said roof-pressing assemblies located at an edge of the roof, a tension adjusting assembly connected to said first pulling cable, and a second pulling cable connected between said tension adjusting assembly and one of said ground-engaging assembly.

9. The apparatus of claim 8 wherein said tension adjusting assembly includes a turnbuckle assembly.

10. The apparatus of claim 1 wherein each of said ground-engaging assemblies includes:

a handle portion connected to one of said second cable assemblies, and a spade portion connected to said handle portion.

11. The apparatus of claim 10, further including:

one or more crossbar members connected to said spade portions of said ground-engaging assemblies.

\* \* \* \* \*